United States Patent [19]

Viessmann

[11] 4,120,250
[45] Oct. 17, 1978

[54] CONNECTING STRUCTURE FOR SHELVES

[76] Inventor: Hans Viessmann, Im Hain, 3559 Battenberg, Fed. Rep. of Germany

[21] Appl. No.: 797,411

[22] Filed: May 16, 1977

[30] Foreign Application Priority Data

May 19, 1976 [DE] Fed. Rep. of Germany ... 7615841[U]
Mar. 22, 1977 [DE] Fed. Rep. of Germany ... 7708836[U]

[51] Int. Cl.² .............................................. A47B 9/00
[52] U.S. Cl. ................................... 108/144; 108/108; 108/114; 108/152; 211/107; 211/126; 211/187; 248/188
[58] Field of Search ................................ 108/107–110, 108/114, 144, 152; 211/126, 133, 187, 188, 107; 248/218.4, 219.1, 219.4, 220.1, 188

[56] References Cited

U.S. PATENT DOCUMENTS

| 2,901,121 | 8/1959 | James | 211/126 |
| 3,187,693 | 6/1965 | Hamilton et al. | 248/188 X |
| 3,420,484 | 1/1969 | Mattick | 248/188 |
| 3,749,343 | 7/1973 | Marschak | 248/188 |

FOREIGN PATENT DOCUMENTS 723,011 12/1965 Canada ............................................. 211/187

Primary Examiner—James C. Mitchell
Attorney, Agent, or Firm—Leonard H. King

[57] ABSTRACT

A connecting structure for shelves comprising horizontally-disposed distributing trays detachably affixed to vertical supporting members. The trays are provided with bent edges and with plastic elbows to cover the corner gaps of adjacent flank faces. The elbows have openings therein for screwing the trays to the supporting members.

24 Claims, 8 Drawing Figures

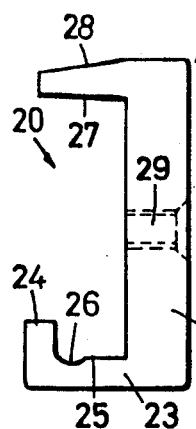
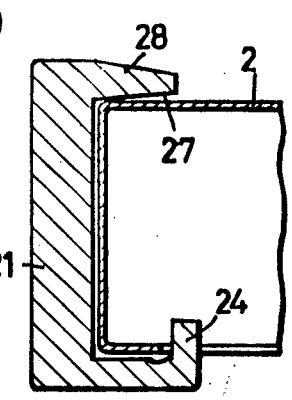
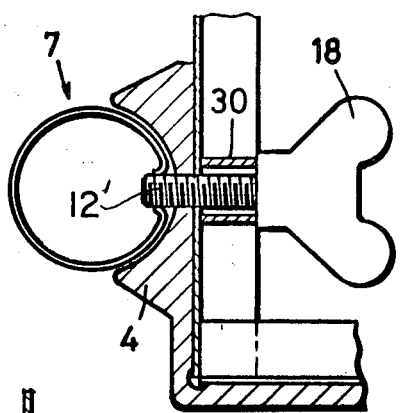
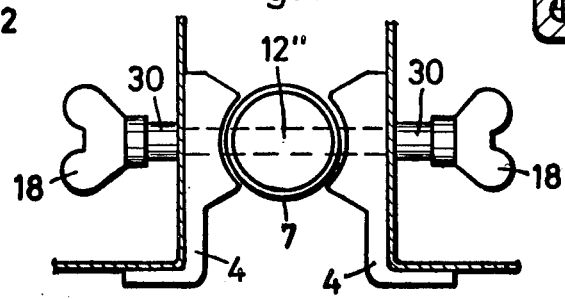
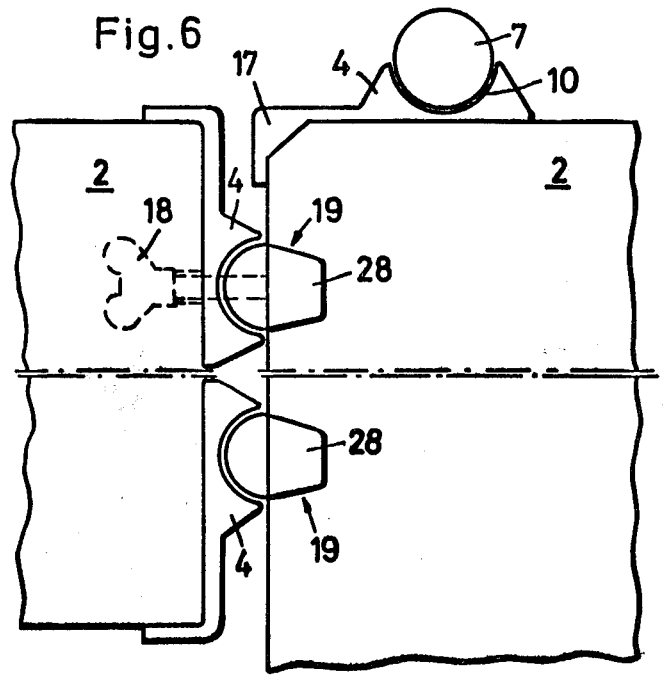

CONNECTING STRUCTURE FOR SHELVES

BACKGROUND OF THE INVENTION

The present invention is concerned with a connecting structure for shelves, especially for storing goods to be cooled or kept fresh in so-called fresh-keeping or cooling cells, with the shelves being formed of vertical supporting elements and horizontal distributing trays to be fixed thereto or connected therewith.

Shelves of the aforementioned type are generally known including those in which the distributing trays may be provided at predetermined spaces. As a rule, angle sections are used for such shelves into the leg faces of which series of oblong holes are punched such that corresponding distributing trays may be inserted or screw-threaded at any desired level. Apart from the little attractive outward appearance of such shelves, which might well be suitable for tool and spare part rooms or the like, they are less suitable for the aforementioned purpose as they do not comply with the high requirements placed upon cleanliness and cleansing. Moreover, the arrangement of the oblong holes in the leg faces requires a considerable amount of punching work.

Basic to the invention is the concept of providing a connecting structure for shelves—i.e. for the vertical supporting elements and the distributing trays—by way of which the supporting elements can be easily connected to the self-supporting distributing trays while complying with hygienical requirements, especially as regards the cleansing thereof.

SUMMARY OF THE INVENTION

This problem is solved by a connecting structure of the aforementioned type in accordance with the invention in that provided in corner zones of the distributing trays, the edges of which are bent, are elbows, preferably of plastic construction, with punch-through openings for screwing the same to the support elements, which elbows in height approximately correspond to the height of the bent flank faces and are secured to the same while covering the corner gap of two adjacent flank faces.

In preferred embodiments the plastic elbows at the side of the supporting element are provided with a recess adapted to the profile of the support element; pins provided with external threads screwed or pressed into the elements or plugged therethrough are located at the supporting elements at the height and distance of the distributing trays; and, finally, a corner spanning face is provided at least on the upper side of the elbow.

By way of an advantageous development, attached to the elbow are U-shaped bracket elements having a plug-on opening adapted to the edge profile of the distributing tray of the shelf, and the base stem of which rearwardly is formed to correspond to the shape of the recess adapted to the support element profile in the plastic elbow, whereby other distributing trays can, in simple manner and at low expenditure, be rectangularly connected to shelves already standing, with no tubular supporting elements being required in this area of connection.

BRIEF DESCRIPTION OF THE DRAWINGS

The connecting structure of the invention hereinafter will be more closely described by way of the graphical illustration of examples of embodiments, wherein:

FIG. 3 is a side view of the bracket element attached to the elbows;

FIG. 4 is a plan view of the bracket element;

FIG. 5 is a sectional view of the bracket element attached to the distributing face of the shelf;

FIG. 6 is a plan view of the rectangular connection of a distributing tray to another distributing tray carried by supporting elements;

FIG. 7 is a sectional view of another preferred embodiment of the connecting structure; and FIG. 8 schematically shows the connection of two distributing trays with a tubular supporting element.

Figure 1:
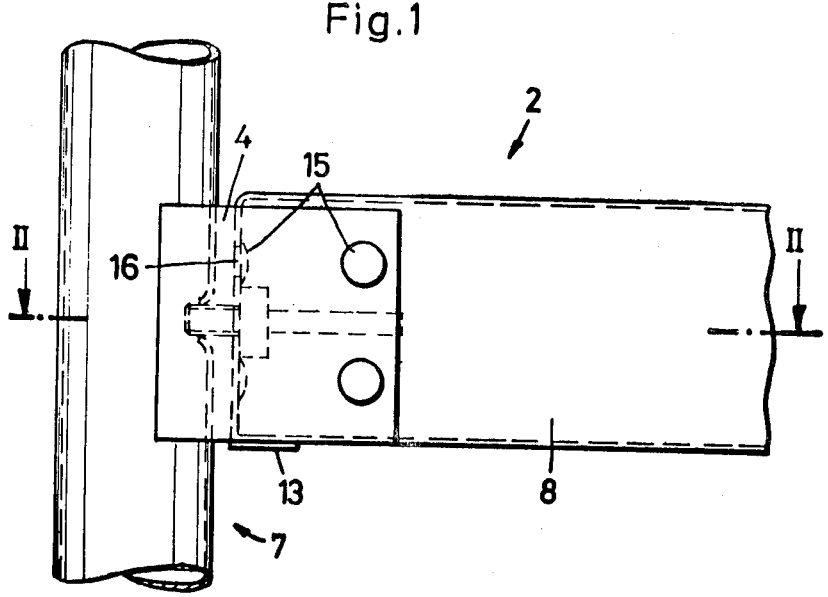
FIG. 1 is a side view of a corner region of a shelf with the connecting structure of the invention.
Figure 2:
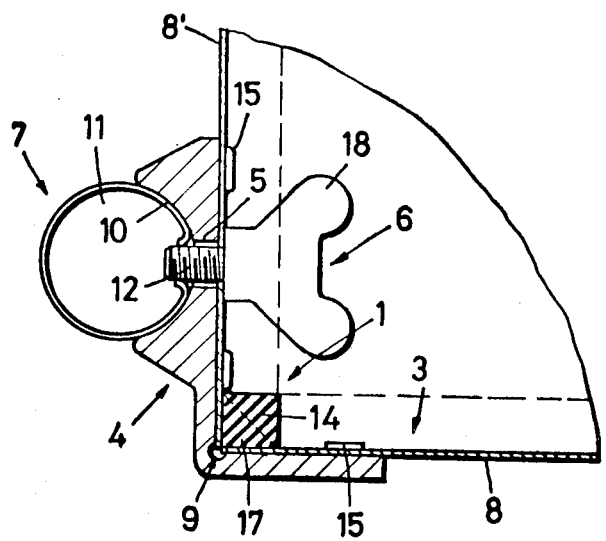
FIG. 2 is a section through the corner region along the line II—II of FIG. 1.

DETAILED DESCRIPTION OF THE PREFERRED EMBODIMENT:

Referring now to the figures, reference numeral 1 designates the corner region; 2 a distributing tray of the shelf; 3 the bent edges of the distributing tray; 4 the plastic elbows; 5 the punch-through openings in the elbows; 6 the screw; 7 the vertical supporting elements formed as tubes 11; 8 and 8', respectively, the flank faces of the distributing trays 2; and 9 designates the gap formed during bending of adjacent flank faces 8 and 8', respectively, which is covered by the elbow as best shown in FIG. 2, and is thus protected against contamination.

Punched or drilled into the walls of the supporting elements 7 are holes into which are either enclosed threaded sleeves or pins 12 or into which threads are cut on the internal side so that the threaded pins can be screwed. The distributing trays of the shelf are made from corresponding sheet blanks—for example, by bending—whereby inwardly open flat box-type shelf inserts arise, with the bottom bending faces 13 overlapping in the cross-hatched area 14 and being resistance-welded. The plastic elbows 4 include short pins 15 by way of which they can be plugged through corresponding holes 16 in the flank faces 8, 8' of the trays and riveted, preferably ultrasonically. For assembly of the entire shelf or rack, the tubes 11 with the connecting pins 12 are plugged through the punch-through openings 5 and are fixed at the distributing trays 2, for example, by means of wing nuts 18. Wing nuts 18 can, of course, be integrally formed with threaded pins 12 and can be screwed from the distributing trays into the threaded openings of the tubes 11.

According to FIG. 7, the threaded pins 12' are slightly longer than pins 12 so that a small sleeve 30 is be provided before the wing nut is screwed envolving the advantage that the operator cannot hurt himself at the bent edges 3 when screwing the wing nuts 18.

The plastic elbows 4 at the side of the supporting or tube element preferably are provided with a recess 10 adapted to the cross-section, so that they well adapt to the profile of the supporting elements.

Moreover, elbows 4 may be provided, as already set out, at least at the upper side with a corner spanning face 17 (see broken line in FIG. 2) so that the whole of the distributing tray corner at least at the upper side is covered by elbow 4. Such a construction, being a plastic article, can be realized in simple manner.

It would, of course, be possible to similarly connect to a tube 11, according to FIG. 8, distributing trays 2 on both sides of the tubes 11, if the same are provided with corresponding receiving elements for through-pins 12" having threads.

Referring now to FIGS. 3 to 6 reference numeral 19 designates the bracket element; 20 the plug-on opening of the U-shaped bracket element 19; 21 the base stem of the bracket element, the outer configuration (22) of which corresponds to the shape of the recess 10 at the plastic elbow 4; and character 7 designates the tubular supporting element profile, forming in pairs the vertical longitudinal or stand spaces of the rack.

The bottom leg 23 of the bracket element 19 is provided with an anchored grip-behind extension 24 acting as demonstrated in FIG. 5, with the inner face 25 of the bottom leg extending in parallel to the extension 24 and being adapted to be provided with a flat pull-off groove 26 facilitating the assembly of the distributing trays 2 provided with the bracket element in the sense of FIG. 6.

Similarly, the inner bearing face 27 of the upper leg may be formed slightly raised toward the plug-on-opening 20 as best shown in FIG. 5.

The provision of a distributing tray 2 (lefthand tray 2 in FIG. 6) provided with the bracket elements 19 is effected in a manner such that the tray is obliquely held downwardly and that the bracket elements 19 with the extensions 24 thereof are caused to grip behind the bottom rear edge of the other distributing tray 2 (righthand tray 2 in FIG. 6), whereafter the tray 2 is simply raised, and at the other end thereof (not shown) either via plastic elbows 4 is connected to support element profiles 7, or a connection with another already standing shelf is established by using another pair of bracket elements. It will, of course, also be possible to first hook the bracket elements and then place the trays 2.

All the trays 2 at the corners thereof are provided with elbows 4 to the recesses 10 of which the rearward shape 22 of the bracket elements 19 is adapted so that the described combination of shelf trays with this uniform and adjustable system is rendered possible.

As disclosed by FIG. 3, the bracket elements 19 are provided with a tapped hole 29 which, in the combination position according to FIG. 6, is in alignment with holes 5 in the elbows 4 so that the entire connecting structure can be fastened by wing nuts 18, which are not visible externally.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A connecting structure for shelves comprising:
 a plurality of vertical supporting members having a predefined profile and having at least one hole therein,
 a tray held in a substantially horizontal orientation by said supporting members and having substantially vertical flank faces and corner edges therebetween,
 a plurality of L-shaped elbows defined by first and second legs secured to adjacent flank faces of said tray adjacent the corner edges thereof and covering the same, each of said elbows having at least one punch-through opening through one of said two legs thereof to receive therethrough screw means for connection of one of said flank faces of said tray to one of said supporting members at the hole provided therein.

2. The connecting structure of claim 1 wherein each of said elbows is secured to adjacent flank faces of said tray by ultrasonic riveting.

3. The connecting structure of claim 1 wherein each of said elbow is provided with a recess, said recess being shaped to conform to said predefined profile for the purpose of a more complete engagement with one of said supporting members.

4. The connecting structure of claim 1, wherein screw means comprises a plurality of vertically spaced apart, externally-threaded pins in said supporting members.

5. The connecting structure of claim 1 wherein each of said elbows is provided with a corner spanning face, to completely cover at least the top of the corner edge.

6. The connecting structure of claim 1 wherein said elbows are constructed of plastic.

7. The connecting structure of claim 3, further comprising a U-shaped bracket having an upper leg, a connecting leg and a lower leg defining an opening sized to receive a portion of one of the flank faces of said tray in holding relation thereto, and having a rear surface reciprocally formed to engage the recess in one of said elbows in the same manner that the recess is formed to engage the predefined profile of one of said supporting members.

8. The connecting structure of claim 7 wherein the lower leg of said bracket is provided with an extension extending upwardly therefrom and in spaced relationship with said connecting leg for engagement with a portion of said tray.

9. The connecting structure of claim 8 wherein the upper leg of said bracket is sloped to provide additional space to enable the application by relative tilting motion of said bracket to one of the flank faces of said tray.

10. The connecting structure of claim 8 wherein the lower leg of said bracket is provided with a groove to facilitate the assembly and removal of said bracket from said tray.

11. The connecting structure of claim 4, further comprising:
 a plurality of sleeves each receiving therethrough one of said externally-threaded pins and in encircling relation thereto, and
 a wing-nut threadedly engaging each said pin to secure said tray to one of said supporting members.

12. The connecting structure of claim 1 wherein each of said supporting members is formed as a tube of circular cross-section.

13. The connecting structure of claim 1 wherein said screw means comprises an externally threaded pin portion and a winged turning portion integral with one end of said pin portion.

14. A connecting structure for shelves comprising:
 a plurality of vertical supporting members having a predefined profile and having at least one hole therein,
 a tray held in a substantially horizontal orientation by said supporting members and having substantially vertical flank faces and corner edges therebetween,
 a plurality of L-shaped elbows defined by first and second legs secured to adjacent flank faces of said tray adjacent the corner edges thereof and covering the same, each of said elbows being provided with a recess, said recess being shaped to conform to said predefined profile for the purpose of a more complete engagement with one of said supporting members, each of said elbows having at least one punch-through opening through one of said two legs thereof to receive therethrough screw means for connection of one of said flank faces of said tray to one of said supporting members at the hole provided therein, and a U-shaped bracket having an upper leg, a connecting leg and a lower leg defining an opening sized to receive a portion of one of the flank faces of said tray in holding relation thereto, and having a rear surface reciprocally formed to engage the recess in one of said elbows in the same manner that the recess is formed to engage the predefined profile of one of said supporting members.

15. The connecting structure of claim 14 wherein each of said elbows is secured to adjacent flank faces of said distributing tray by ultrasonic riveting.

16. The connecting structure of claim 14, wherein said screw means comprises a plurality of spaced apart, externally-threaded pins in said supporting members.

17. The connecting structure of claim 14 wherein each of said elbows is provided with a corner spanning face, to completely cover at least the top of the corner edge.

18. The connecting structure of claim 1 wherein said elbows are constructed of plastic.

19. The connecting structure of claim 14, wherein the lower leg of said bracket is provided with an extension extending upwardly therefrom and in spaced relationship with said connecting leg for engagement with a portion of said tray.

20. The connecting structure of claim 19 wherein the upper leg of said bracket is sloped to provide additional space to enable the application by relative tilting motion of said bracket to one of the flank faces of said tray.

21. The connecting structure of claim 19 wherein the lower leg of said bracket is provided with a groove to facilitate the assembly and removal of the bracket from said tray.

22. The connecting structure of claim 16, further comprising:
- a plurality of sleeves each receiving therethrough one of said externally-threaded pins and in encircling relation thereto, and
- a wing-nut threadedly engaging each said pin to secure said tray to one of said supporting members.

23. The connecting structure of claim 14 wherein each of said supporting members is formed as a tube of circular cross-section.

24. The connecting structure of claim 14 wherein said screw means comprises an externally threaded pin portion and a winged turning portion integral with one end of said pin portion.

* * * * *